(12) United States Patent
Hoghaug et al.

(10) Patent No.: US 8,819,248 B2
(45) Date of Patent: Aug. 26, 2014

(54) SECURE MESSAGING FACILITY SYSTEM

(71) Applicant: Indigo Identityware, Inc., Edina, MN (US)

(72) Inventors: Robert John Hoghaug, Prior Lake, MN (US); Thomas Andrew Hoghaug, Chanhassen, MN (US)

(73) Assignee: Indigo Identityware, Inc., Minnetonka, MN (US)

( * ) Notice: Subject to any disclaimer, the term of this patent is extended or adjusted under 35 U.S.C. 154(b) by 0 days.

(21) Appl. No.: 13/740,564

(22) Filed: Jan. 14, 2013

(65) Prior Publication Data

US 2014/0032661 A1   Jan. 30, 2014

Related U.S. Application Data

(63) Continuation of application No. 11/352,563, filed on Feb. 13, 2006, now Pat. No. 8,356,104.

(60) Provisional application No. 60/653,250, filed on Feb. 15, 2005.

(51) Int. Cl.
   *G06F 15/16* (2006.01)

(52) U.S. Cl.
   USPC ...................................................... 709/227

(58) Field of Classification Search
   USPC ............................................... 709/227–229
   See application file for complete search history.

(56) References Cited

U.S. PATENT DOCUMENTS

| | | |
|---|---|---|
| 5,948,064 A | 9/1999 | Bertram et al. |
| 6,615,264 B1 | 9/2003 | Stoltz et al. |
| 6,725,269 B1 | 4/2004 | Megiddo |
| 7,107,538 B1 | 9/2006 | Hinckley et al. |
| 7,114,075 B1 | 9/2006 | Yasuda et al. |
| 7,124,370 B2 | 10/2006 | Fish et al. |
| 7,185,066 B2 | 2/2007 | Noble et al. |
| 7,188,314 B2 | 3/2007 | Mizrah et al. |
| 7,233,927 B1 | 6/2007 | Norton et al. |

(Continued)

FOREIGN PATENT DOCUMENTS

| | | |
|---|---|---|
| WO | WO-2006017112 A2 | 2/2006 |
| WO | WO-2007081834 A2 | 7/2007 |
| WO | WO-2007095097 A2 | 8/2007 |
| WO | WO-2007100468 A2 | 9/2007 |

OTHER PUBLICATIONS

"U.S. Appl. No. 11/352,563, Information Disclosure Statement filed Dec. 28, 2009", 5 pgs.

(Continued)

*Primary Examiner* — Jason Recek
(74) *Attorney, Agent, or Firm* — Schwegman Lundberg & Woessner, P.A.

(57) ABSTRACT

A secure message facility transfers authentication data between various applications, operating systems, and authentication devices and software in the form of messages. These messages comprise a data structure with a standard header with fields that describe the class, length, and type of message, and routing information. This header information is used to route the message to the appropriate handler. The messages are transferred between applications via the messaging facility DLL and the messaging facility Service. The messaging facility DLL is intended to be loaded by an application. The messaging facility DLL forms the messages, directs them to the appropriate messaging facility service (local or remote) and interprets the responses. The messages sent between the messaging facility DLL and messaging facility Service are extremely flexible and can be used to send any type of data or content of messages.

3 Claims, 8 Drawing Sheets

(56) References Cited

U.S. PATENT DOCUMENTS

| | | |
|---|---|---|
| 7,519,910 B2 | 4/2009 | Saka |
| 8,356,104 B2 | 1/2013 | Hoghaug et al. |
| 2003/0046401 A1 | 3/2003 | Abbott et al. |
| 2004/0010724 A1 | 1/2004 | Brown et al. |
| 2004/0088692 A1 | 5/2004 | Stutton et al. |
| 2004/0139309 A1 | 7/2004 | Gentil et al. |
| 2004/0139355 A1 | 7/2004 | Axel et al. |
| 2004/0167984 A1 | 8/2004 | Herrmann |
| 2004/0215791 A1 | 10/2004 | Tsao |
| 2004/0220996 A1 | 11/2004 | Huang et al. |
| 2005/0066202 A1 | 3/2005 | Evans et al. |
| 2005/0188316 A1 | 8/2005 | Ghanamgari et al. |
| 2005/0188317 A1 | 8/2005 | Matthews et al. |
| 2005/0235139 A1 | 10/2005 | Hoghaug et al. |
| 2007/0074119 A1 | 3/2007 | Komine et al. |
| 2007/0101155 A1 | 5/2007 | Hoghaug et al. |
| 2007/0136482 A1 | 6/2007 | Hoghaug et al. |
| 2007/0136581 A1 | 6/2007 | Hoghaug et al. |

OTHER PUBLICATIONS

"U.S. Appl. No. 10/888,039, Application and File history filed Jul. 9, 2004".

"U.S. Appl. No. 10/888,039, Office Action mailed Jul. 9, 2004".

"U.S. Appl. No. 11/329,216, Application and File History filed Jan. 10, 2006".

"U.S. Appl. No. 11/352,563, Advisory Action mailed Mar. 18, 2010", 3 pgs.

"U.S. Appl. No. 11/352,563, Examiner Interview Summary mailed Feb. 21, 2012", 3 pgs.

"U.S. Appl. No. 11/352,563, Final Office Action mailed Jan. 8, 2010", 9 pgs.

"U.S. Appl. No. 11/352,563, Final Office Action mailed Nov. 10, 2011", 11 pgs.

"U.S. Appl. No. 11/352,563, Non Final Office Action mailed Jan. 9, 2009", 8 pgs.

"U.S. Appl. No. 11/352,563, Non Final Office Action mailed Mar. 29, 2011", 10 pgs.

"U.S. Appl. No. 11/352,563, Notice of Allowance mailed Sep. 13, 2012", 8 pgs.

"U.S. Appl. No. 11/352,563, Preliminary Amendment filed Feb. 13, 2006", 3 pgs.

"U.S. Appl. No. 11/352,563, Response filed Mar. 5, 2012 to Final Office Action mailed Nov. 10, 2011", 10 pgs.

"U.S. Appl. No. 11/352,563, Response filed Mar. 8, 2010 to Final Office Action mailed Jan. 8, 2010", 10 pgs.

"U.S. Appl. No. 11/352,563, Response filed Aug. 26, 2011 to Non Final Office Action mailed Mar. 29, 2011", 9 pgs.

"U.S. Appl. No. 11/352,563, Response filed Sep. 28, 2009 to Non Final Office Action mailed Jan. 9, 2008", 8 pgs.

"U.S. Appl. No. 11/352,966, Application and File History filed Feb. 13, 2006".

McFedries, "The Complete Idiot's Guide to Windows XP", Alpha Books, Chapter 2. a field Guide to Windows XP: Starting Windows XP-printed, (Oct. 3, 2001).

SECURE MESSAGING FACILITY SYSTEM

CROSS REFERENCES TO RELATED APPLICATIONS

This application claims benefit from U.S. application Ser. No. 11/352,563, filed Feb. 13, 2006, which claims priority to U.S. Provisional Application No. 60/653,250, filed Feb. 15, 2005, which applications are hereby incorporated into this application by reference in their entirety. This patent application is also related to U.S. Provisional Application 60/643,029, filed Jan. 11, 2005, U.S. Provisional Application No. 60/653,249, filed Feb. 15, 2005, and U.S. application Ser. No. 11/352,966, filed Feb. 13, 2006, all of which are incorporated herein by reference in their entirety.

BACKGROUND OF THE INVENTION

1. Field of the Invention

The present invention relates to software messaging for computer workstations, servers, networks, and the like, and more particularly, to a method, software, and system for passage of authentication data between computer resources, including hardware devices, operating systems, and graphical identification and authentication modules, and application software, whether locally, remotely, or in combination. The secure messaging facility is intended for use by individuals and businesses that need to limit access to secured resources.

2. Description of the Prior Art

Most authentication-based applications, other than certain proprietary authentication components, communicate with one another by directly loading each other into their respective address spaces. This method of interaction is known as tightly coupled, meaning that individual applications directly call functions of the other applications and load the hardware drivers directly. This method of interaction is very rigid and limiting, since a high degree of compatibility is needed for the applications to be able to properly call functions of the other applications. In order to obtain this high degree of compatibility, highly customized modifications to application and authentication software can be required. The ability to accommodate local and remote users and authentication devices, and provide secure access to local and remote resources, severely limits the flexibility of such an approach.

SUMMARY OF THE INVENTION

The general purpose of the present invention is to provide a system for transferring data between various applications to enable efficient and flexible secure authentication. Specifically, the present invention overcomes inadequacies of the prior art by creating a novel architecture for authentication-related data transfer and communication between the various users, authentication modules, authentication devices, operating systems, application software, and other resources, including local and remote hardware, software, and data. The present invention provides this utility by transferring all the required data through the messaging facility in the form of messages. Since the authentication-related data is transferred throughout the messaging facility layer in the form of messages, the secure messaging facility of the present invention provides for simpler and more flexible authentication among various local and remote resources. The messages use a request and response format meaning that for every message request submitted there is a response message generated.

The present secure messaging facility has particular utility for computers, workstations, and servers running Microsoft Windows NT based operating systems. The present invention also has utility for computers running other operating systems, and can be adapted for such.

The messaging facility is comprised of three main components; the first creates and processes messages and contains the messaging facility library which is an object code library such as those loaded by Windows applications. These libraries are normally referred to as Dynamic Link Libraries or DLLs. The second component is the messaging facility Service which is a specialized version of the standard Windows application which is designed to be loaded when the operating system starts. The third component is a proprietary authentication server.

All messages originate in the messaging facility DLL (i.e., the Windows applications) and are sent to the messaging facility Service located on the same machine to which the application loaded the messaging facility DLL. The messages, however, need not be destined for the local messaging facility Service but may be destined instead for a messaging facility Service located on another machine, or for the proprietary authentication server. The final location of a particular message can be effected by various controls, including control by the local messaging facility Service, and including use of information stored in the message itself.

The messaging facility Service is started when the workstation or server boots, and stays running the entire time the operating system is on. The messaging facility Service is largely passive since it only responds to messages sent to it by the messaging facility dynamic link library. The primary purpose and function of the messaging facility DLL is to form the messages to be sent to the messaging facility Service where they can be processed or directed to the proprietary authentication Service or another messaging facility Service running on another system. The actual message sent between the messaging facility DLL and messaging facility Service is designed to be extremely flexible and can be used to send almost any type of information.

One significant aspect and feature of the present invention is secure messaging system for communication of authentication data, that is easy to integrate into any application software requiring high levels of security authentication, freeing the software developer from designing, implementing and testing their own version of an authentication system.

Another significant aspect and feature of the present invention is a secure authentication software development package for use with any combination or variety of biometric, token, proximity or password devices to securely authenticate the user.

A further significant aspect and feature of the present invention is the ability to maintain a detailed and secure audit trail of successful and unsuccessful authentications and logged events.

Yet another significant aspect and feature of the present invention is a communication and coordination system for secure authentication where software applications and authentication hardware are uncoupled, and can therefore be local or remote.

Still another significant aspect and feature of the present invention is a secure messaging facility which is easily adapted and independent of underlying hardware.

A further significant aspect and feature of the present invention is a secure messaging facility for flexibly implementing local and remote authentication, which is applicable to a variety of operating system environments, including Microsoft Windows NT/2000/XP related operating systems as well as non-Microsoft Windows NT/2000/XP related operating systems.

Having thus described embodiments and significant aspects and features of the present invention, it is the principal object of the present invention to provide a connection between software operating systems or user applications and authentication applications, authentication devices, or Services.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is a secure messaging facility which overcomes problems of the prior art methods and software. The messaging facility is comprised of three main components. The first component creates and processes messages and comprises the messaging facility library, which is an object code library loaded by software applications. These libraries are normally referred to as Dynamic Link Libraries or DLLs. The second component is the messaging facility Service which is a specialized version of the standard Windows application designed to be loaded when the operating system starts. The third component is a proprietary authentication server.

All messages originate in the messaging facility library DLL (i.e., the Windows applications) and are sent to the messaging facility Service located on the same machine to which the application loaded the messaging facility library. The messages, however, need not be destined for the local messaging facility Service but may be destined instead for an messaging facility Service located on another machine, or for the proprietary authentication server. The final location of a particular message can be effected by various controls, including control by the local messaging facility Service, and including use of information stored in the message itself. The use of the message itself to specify the destination of the message makes the present invention particularly adaptable.

The messaging facility Service is started when the workstation or server boots, and stays running the entire time the operating system is on. The messaging facility Service is largely passive since it only responds to messages sent to it by the messaging facility dynamic link library. The primary purpose and function of the messaging facility DLL is to form the messages to be sent to the messaging facility Service where they can be processed or directed to the proprietary authentication Service or another messaging facility Service running on another system. The actual message sent between the messaging facility DLL and the messaging facility Service is designed to be extremely flexible and can be used to send almost any type of information.

Figure 5:
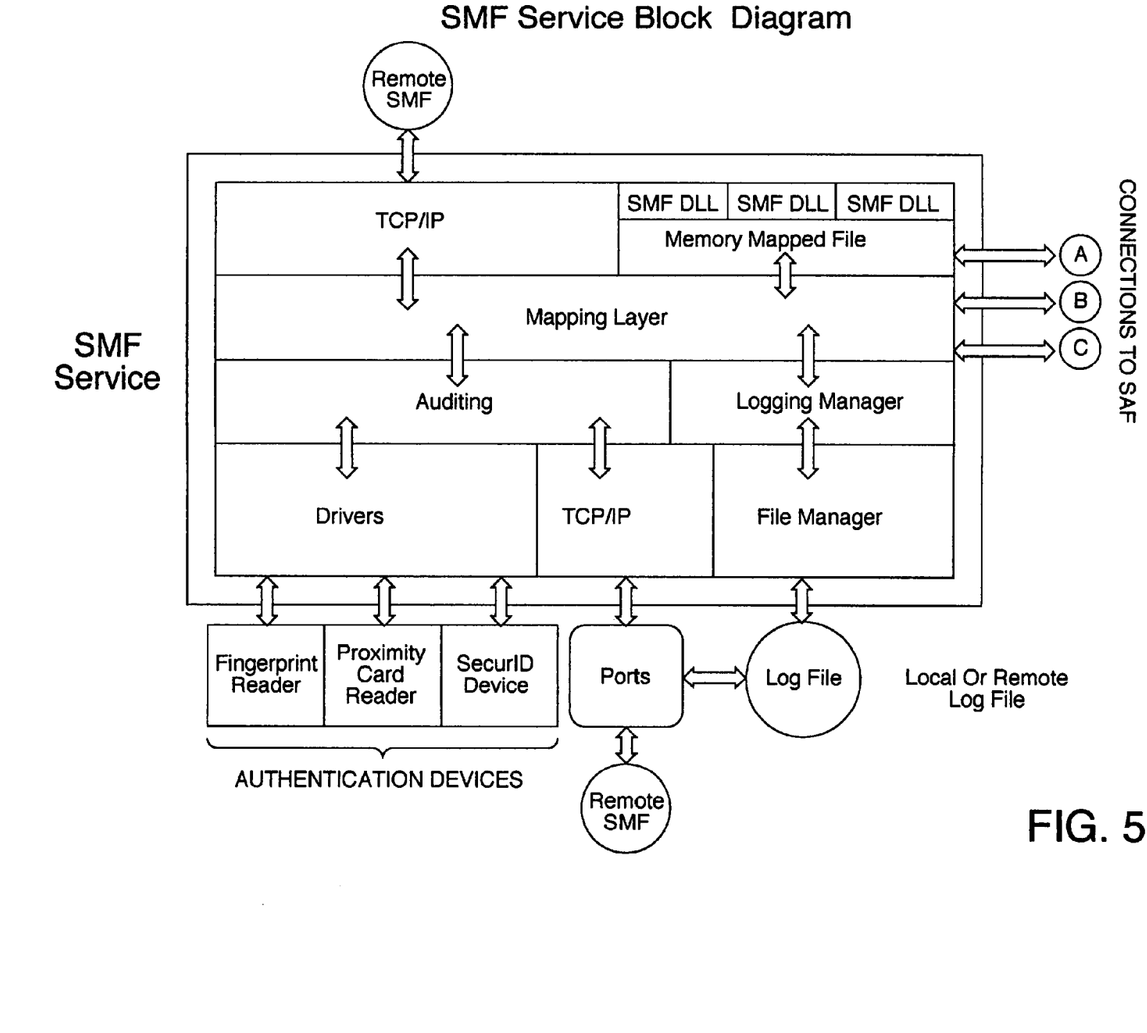
FIG. 5 is a block diagram of the messaging facility layers.
Figure 8:
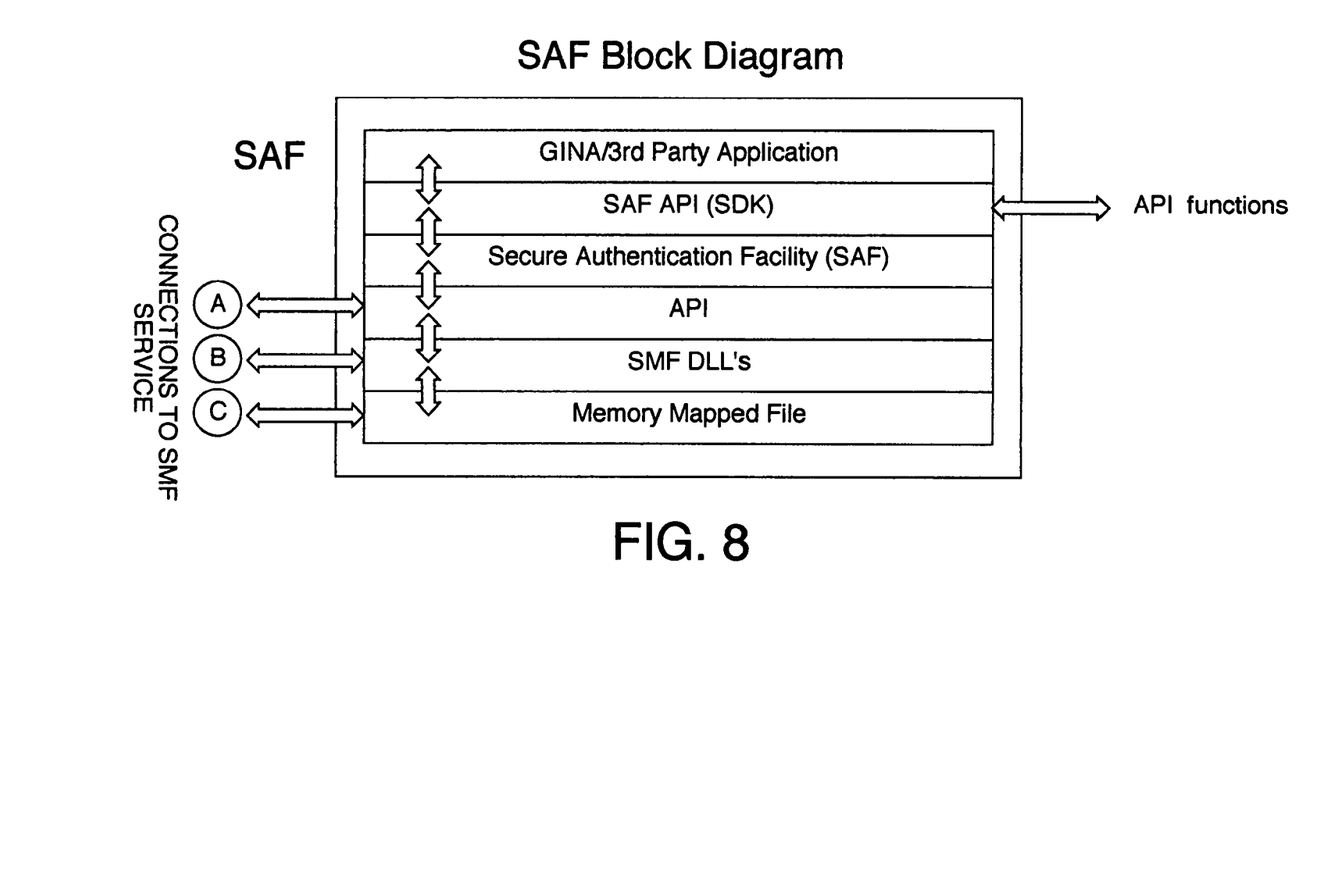

As illustrated in FIG. 5, the secure messaging facility (SMF) comprises multiple components or layers which interact to enable proper function. One or multiple instances of the SMF DLL are utilized; some instances may be located on remote workstations, servers, or resources. A memory mapped file and mapping layer serves to coordinate the various instances. Transfer of SMF messages can be by TCP/IP as illustrated, or by other protocol. The SMF DLL(s) interact with each other via the memory mapped file/mapping layer facilitating auditing, logging management, and file management functions as depicted. In one embodiment, the secure messaging facility interacts with a secure authentication facility (an example of which is illustrated in FIG. 8) as indicated. The secure messaging facility communicates with authentication devices and any required drivers, and communicates with remote SMF via ports with local and/or remote logging as illustrated.

FIG. 5 depicts the interaction of the various functional components of the present invention with each other, as well as other resources devices and software, including connections with local and remote software and hardware devices. Examples of authentication devices which may be utilized with the secure messaging facility include, but are not limited to, passwords, tokens, SecurID, proximity devices, and various types of biometric authentication devices, such as fingerprint or other body feature scanner, sensor, or recorder, voice recognition, and other authentication devices as may become available, and with drivers required for their use. The secure messaging facility of the present invention facilitates utilization of such authentication device(s) even if the device(s) and the secure resource for which authentication is required are not located on the same workstation, server, terminal, kiosk, network access point, PDA, or other computing resource access device.

Figure 1:
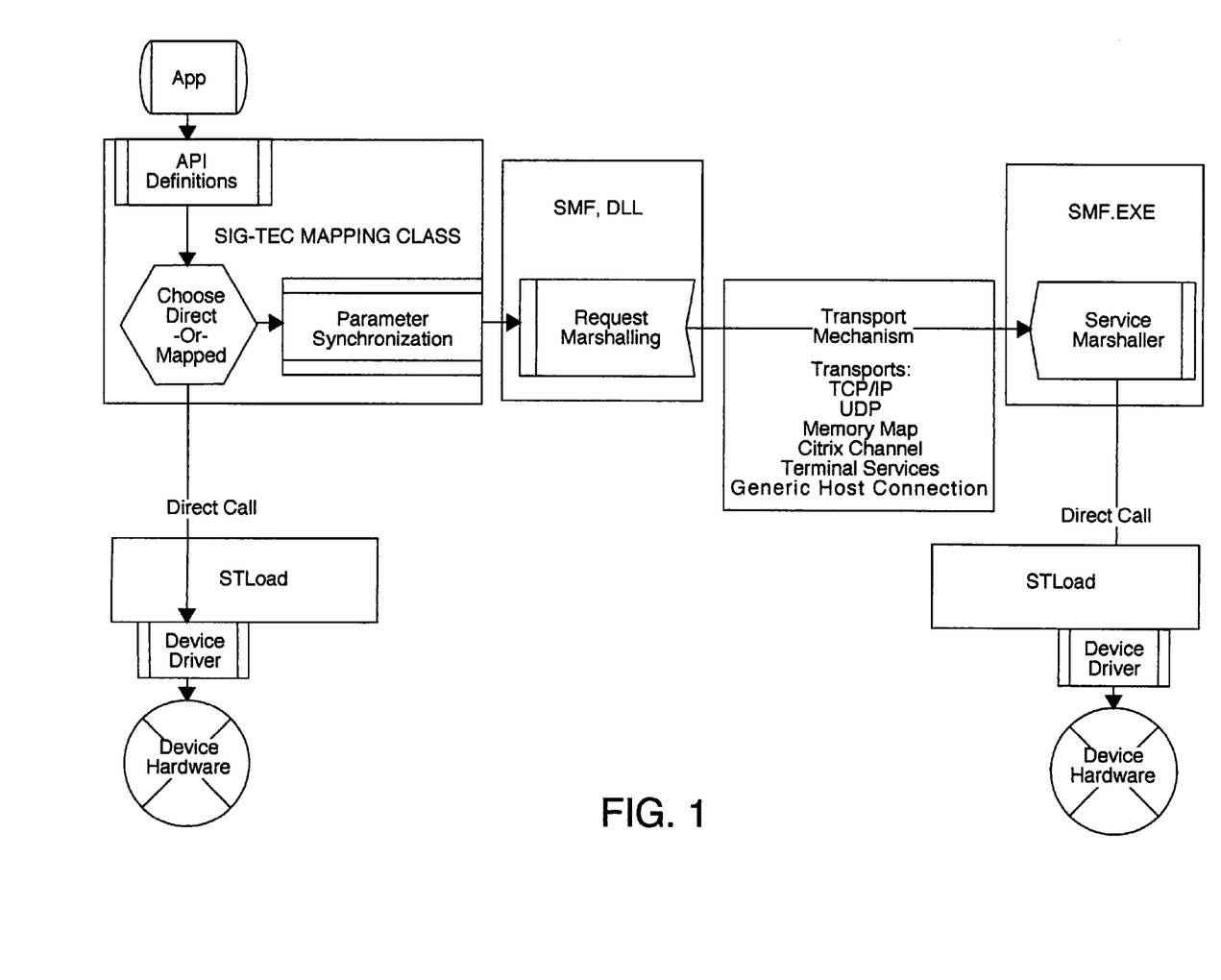
FIG. 1 is a data flowchart of the present invention.

FIG. 1 is a flowchart of the data flow of the present invention. The flowchart depicts the data flow based on the calls and requests of the software. In this example and embodiment, a particular software application (App) requires communication and access to device hardware. The application via API definitions interacts with a proprietary function, Sig-Tec Mapping Class (CST Map) which determines whether a direct or mapped configuration can be utilized. In the direct configuration, a direct call is made, with STLoad and access to the device hardware via any required device driver. In the mapped configuration, with parameter synchronization the secure messaging facility and marshaling request utilizes any of a variety of transport mechanisms (including, but not limited to, TCP/IP, UDP, Memory Map, Citrix, terminal services, or generic host connection) communicating with the secure messaging facility executable file and service marshaller to perform a direct call, with STLoad and access to the device hardware via any required device driver. Thus, direct call by the application, and call via the secure messaging facility, can coexist depending on the particular requirements and any customization of the application. FIG. 1 also details the interaction between the DLL entry and the executable program. The varying data will return different values based on response or validity.

Figure 2:
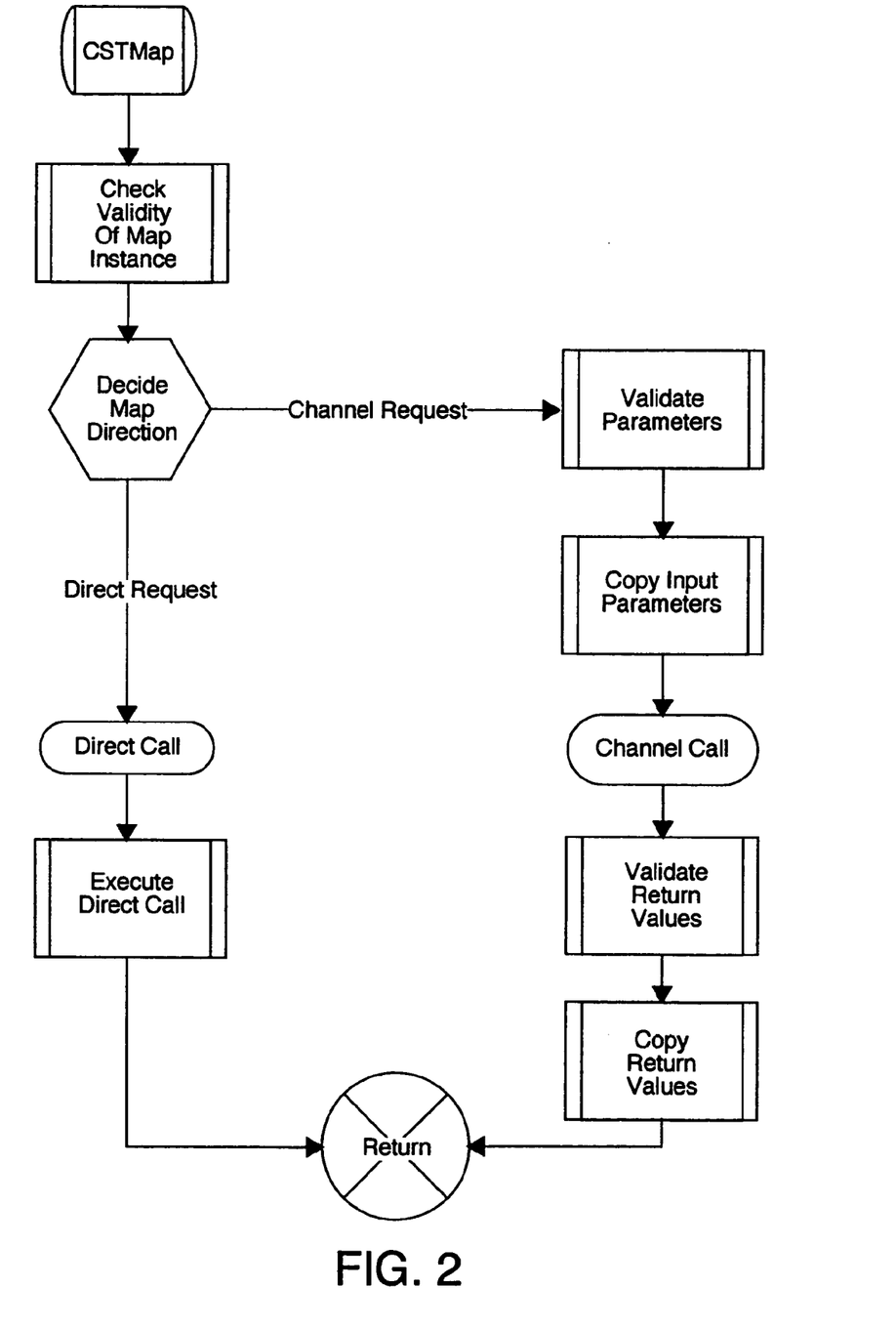
FIG. 2 is a continuation of the data flowchart FIG. 1.

In another embodiment of the present invention, FIG. 2 is a flowchart which depicts data flow of the present invention's validation functions and validation values returned. Data flows via the CST Map to verification of the validity of the map instance, to decision whether a direct call or an indirect call is to be performed. In the case of an indirect call, a channel request is performed, parameters validated, input parameters copied, and a channel call is performed with validation and copying of the return values.

Figure 3:
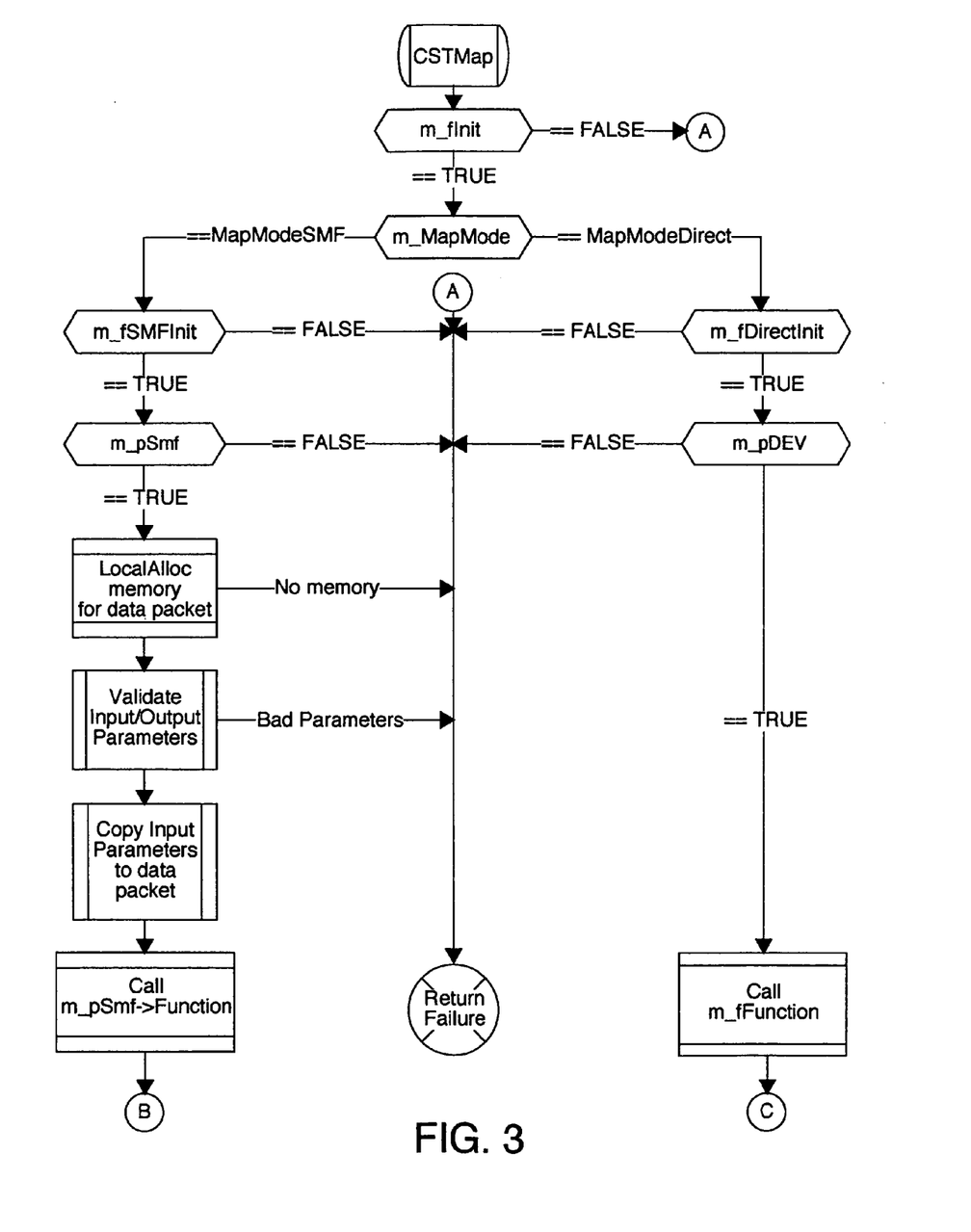
FIG. 3 is a continuation of the data flowchart FIGS. 1 and 2.
Figure 4:
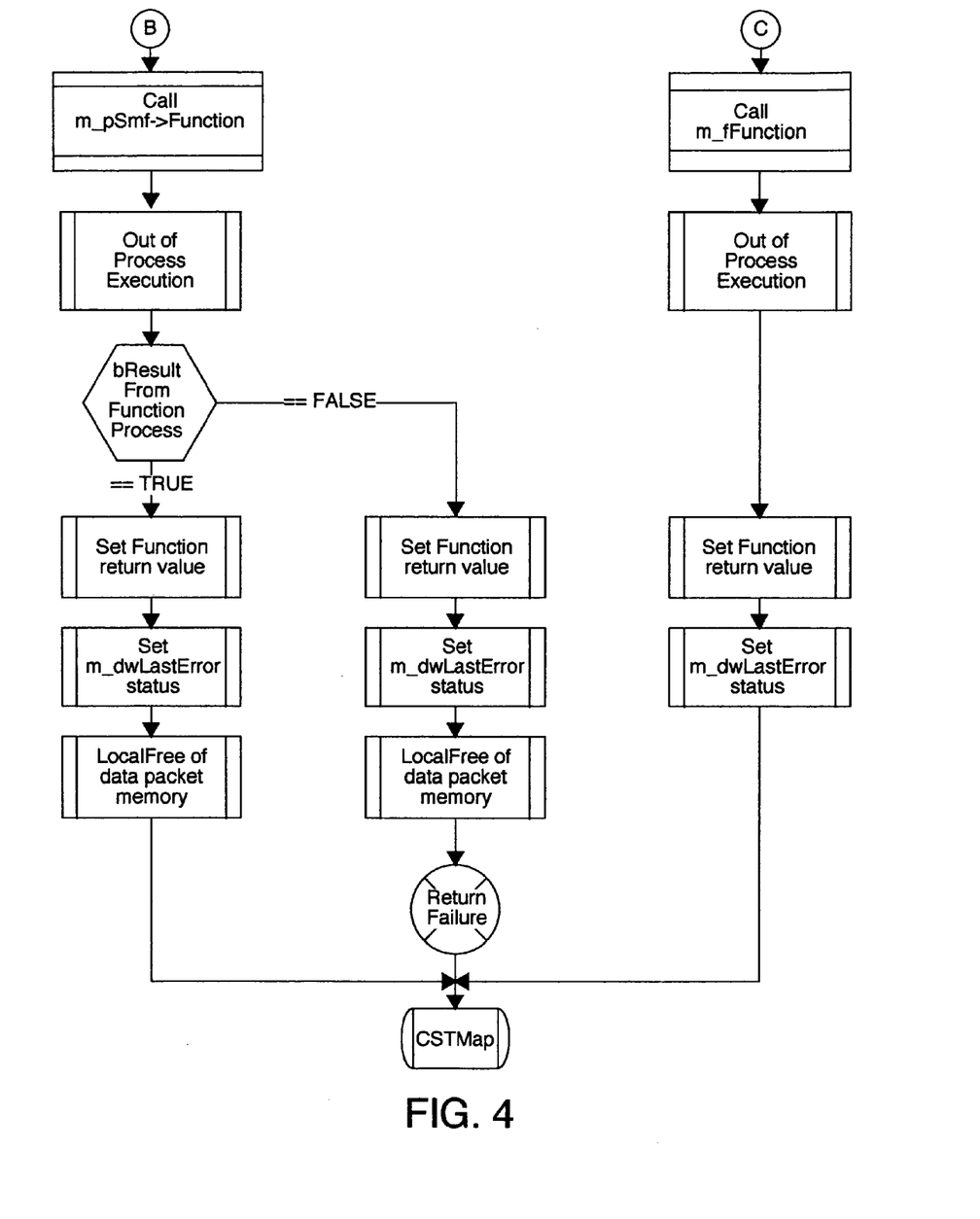
FIG. 4 is a continuation of the data flowchart from FIGS. 1, 2 and 3.

In a further extended and detailed flowchart, FIGS. 3 and 4 depicts logic and data flow for and embodiment of the present invention, with validation of data. As in FIGS. 1 and 2, there is a path for direct call and a path for mapped call via the secure messaging facility. With various initialization and logical tests, the direct mode results in a direct call and the mapped or indirect mode utilizes the secure messaging facility, with memory map and validation of input/output parameters, creation of a message, transport of the message, call of SMF function, and a resulting true or false from the function process, to return the result to the CST Map. Item A of FIG. 3 is a return failure path which is entered when any of several logical tests return false. Items B and C from FIG. 3 continue to items B and C of FIG. 4.

Figure 6:
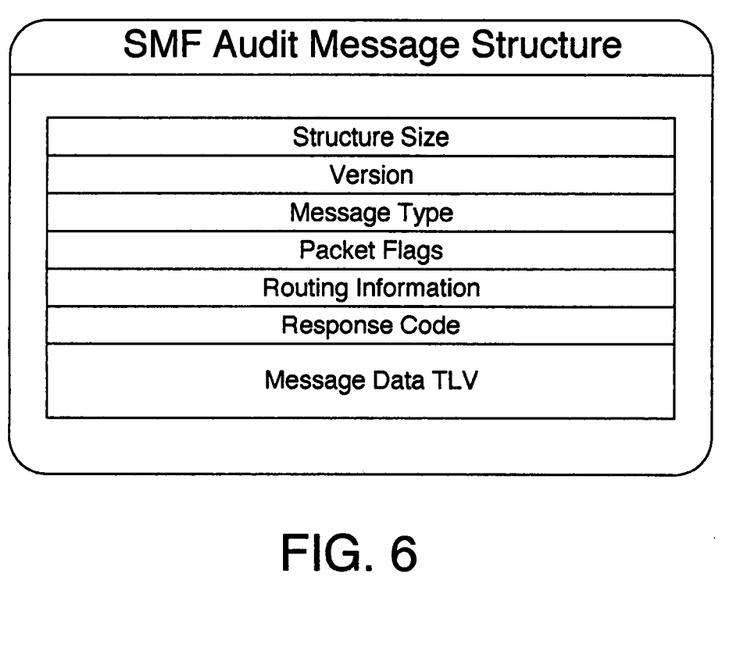
FIG. 6 is a block diagram of the message structure of the messaging facility and illustrating message header.

FIG. 6 is a block diagram of the message structure of a message of the secure messaging facility of the present invention. The message contains multiple elements in a header, and message data TLV which will be described in FIG. 7. The header can be configured in a variety of ways, depending on the particular requirements of the system. In this example, the header information comprises structure size, version, message type, packet flags, routing information, and response code fields. Additional fields may be incorporated as well, if desired, in keeping with the present invention. In any case, some type of header will typically be used, although the particular fields can be structured differently from those depicted. Request and response messages consist of data structures starting with a static header containing fields for message routing information, the class that a message belongs to, the message type within the specific class, the length of the message data and the information or value associated with the message. All message data takes the form of a TLV (Type, Length, and Value). A message may have more the one TLV associated with it. Header information is used to route, classify, and determine the appropriate local handler and whether it should be sent on to another system for further processing.

Figure 7:
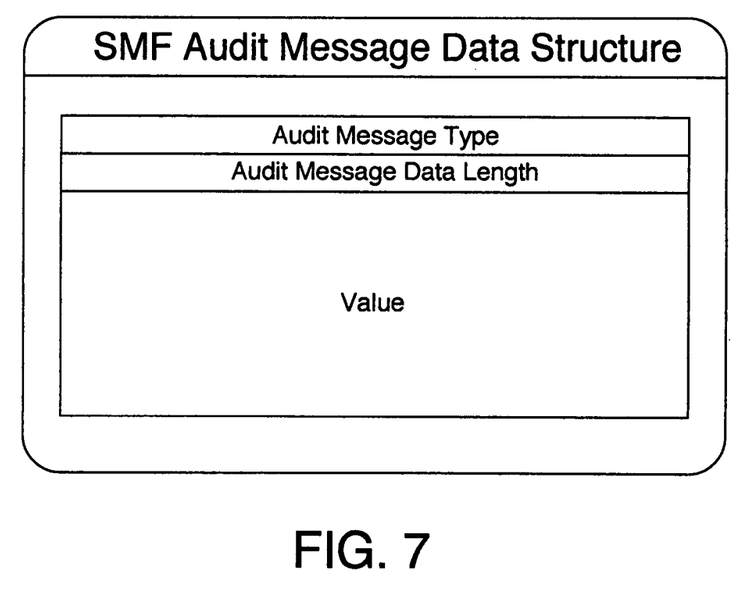
FIG. 7 is a block diagram of the structure of the message data portion of a message of the message facility; and, FIG. 8 is a block diagram of the secure authentication facility.

FIG. 7 is a block diagram of the structure of the message data portion of the message structure of FIG. 6. The Message Data TLV block of FIG. 6 is detailed in FIG. 7. The Message structure has the form TLV, that is, type, length, and value. The message may comprise multiple TLV blocks, although only one is depicted in FIGS. 6 and 7. Type is a numerical classification depending on the particular function of the message; length defines how long the message is (number of bytes or bits or characters), and value is the particular data being transferred or returned via the message.

An example of a secure authentication facility is illustrated in FIG. 8, which connects to FIG. 7 via items A, B and C. In this example, a graphical identification and authentication (GINA) or third party application interacts with and accesses a secure authentication facility, API functions, and a memory mapped file via the secure messaging facility DLLs.

MODE OF OPERATION

The secure messaging facility has a very flexible messaging architecture. In order for an application to use the messaging facility components, a programmer will link and load the messaging facility library (DLL). This can be accomplished using a standard Win32 API call or by using the newer COM and Windows. NET methods for accessing Windows DLLs. Once the messaging facility library is loaded into an application, it must be initialized. This initialization sets up a shared memory region that allows contact and information exchange with the messaging facility Service located on the same system as the messaging facility DLL. The messaging facility DLL may not need to access any of the handlers in the messaging facility Service but utilizes a connection to the local messaging facility so that it may contact the appropriate messaging facility Service running on a remote system.

The messaging facility Service is passive and does not normally distinguish between local messages retrieved from the shared memory region (an application running the local messaging facility DLL) and messages retrieved from the TCP/IP connection or other type of communication protocol, information sent to the messaging facility Service from a messaging facility DLL located on another system. This simplifies the coding of the messaging facility Service as all messages to the handlers are acted upon in the same manner and only the response messages are different in the information contained in the header. All messages contain routing information and the messaging facility Services do not need to keep any state information as to where or how the message was received. The messaging facility Service is passive in nature, so it never initiates communication with the messaging facility DLL.

The messaging facility Service is designed to receive messages from the messaging facility, route them to the correct message handler and then formulate an appropriate response. The messaging facility Service handlers are not dependent upon message origination, as this information is stored in the message header and is only used by the send message routine to route the message back to the correct messaging facility library. The messaging facility Service is intended to handle multiple connections from multiple messaging facility libraries either located locally or remotely. The routing information for each message is stored in the message header and is the responsibility of the messaging facility DLL. This simplifies the messaging facility Service logic and the design of the messages themselves. There is a hierarchy to how message are created and how the handlers for these messages are determined, and all messages are placed in a specific class that describes in general what type of message it is. Some examples are the audit message class and the credential message class. Within a message class there can be multiple message categories; the messages created by the messaging facility are generally derived from the application programming interfaces (API).

In some embodiments, the secure messaging facility is adapted for 32-bit Windows NT-based operating systems, including, but not limited to, Windows NT 4.0 Server/Workstation, Windows 2000 Server/Workstation, and Windows XP systems.

In another embodiment, the secure messaging facility is adapted for a 64-bit operating system environment.

In yet another embodiment, the secure authentication facility is configured to run on operating systems other than Windows NT based operating systems.

Some embodiments of the present invention comprise software. Additional embodiments of the present invention comprise methods of authentication data transfer. One such method provides for transfer of user authentication data accommodating remote authentication device(s). Another such method provides for transfer of user authentication data accommodating remote applications and resources.

Various modifications can be made to the present invention without departing from the apparent scope hereof. This description will suggest many variations and alternatives to one of ordinary skill in this art. The various elements described may be combined or modified for combination as desired. All these alternatives and variations are intended to be included within the scope of the claims. Further, the particular features presented in the dependent claims can be combined with each other in other manners within the scope of the invention.

It is claimed:

1. A system for transferring user authentication data, from an origin to a destination, comprising:
   a user authentication server including a remote messaging facility service;
   a user computer communicatively coupled to the user authentication server and a user authentication device, and comprising:
      an application software module;
      a local messaging facility service in communication with the application software module, the local messaging facility service comprising:
         a plurality of dynamically-linked libraries (DLL) with at least one DLL of the plurality of DLLs initialized within the application software module;
         a mapping layer to coordinate communication among the plurality of DLLs;
         a plurality of message handlers to process messages from the plurality of DLLs, wherein at least a portion of the message handlers use a message class included in a message to determine which of the portion of the message handlers are to handle the message;
         an interface to a transport mechanism to communicate with remote message facility services; and
         a driver interface to communicate with the user authentication device;
         wherein a DLL of the plurality of DLLs is configured to:
            provide a communication bridge between the application software module and the local messaging facility service;
            obtain user authentication data from the user authentication device via either the application software module or the driver interface;
            create a secure message that includes the user authentication data; and
            transmit the secure message to the local messaging facility service, and wherein the local messaging facility service is configured to:
               receive the secure message from the DLL using a message handler from the plurality of message handlers;
               determine by the message handler the that the remote messaging facility service is a destination of the secure message based on destination information in the secure message; and
               route the secure message to the remote messaging facility service using the transport mechanism.

2. A method of transferring user authentication data from an origin to a destination comprising:
   providing a DLL that creates a message, which includes the user authentication data obtained from a user authentication device at the origin and a destination information description indicating the destination of the message, wherein the DLL is associated with a local messaging facility service, the local messaging facility service comprising:
      a plurality of dynamically-linked libraries (DLL) including the DLL;
      a plurality of message handlers to process messages from the plurality of DLLs, wherein at least a portion of the message handlers use a message class included in a message to determine which of the portion of the message handlers are to handle the message;
      an interface to a transport mechanism to communicate with remote message facility services; and
      an interface to communicate with the user authentication device; and
   transferring the message from the origin to the destination using the DLL by:
      creating a secure message that includes the user authentication data; and
      transmitting the secure message to the local messaging facility service;
      receiving the secure message at the local messaging facility service from the DLL using a message handler from the plurality of message handlers;
      determining by the message handler that the destination is an authentication server having a remote messaging facility service based on destination information in the secure message; and
      routing the secure message to the remote messaging facility service using the transport mechanism.

3. A non-transitory computer-readable medium comprising instructions for transferring user authentication data from an origin to a destination, which when executed by a computer, cause the computer to:
   provide a DLL that creates a message, which includes the user authentication data obtained from a user authentication device at the origin and a destination information description indicating the destination of the message, wherein the DLL is associated with a local messaging facility service, the local messaging facility service comprising:
      a plurality of dynamically-linked libraries (DLL) including the DLL;
      a plurality of message handlers to process messages from the plurality of DLLs, wherein at least a portion of the message handlers use a message class included in a message to determine which of the portion of the message handlers are to handle the message;
      an interface to a transport mechanism to communicate with remote message facility services; and
      an interface to communicate with the user authentication device; and
   transfer the message from the origin to the destination using the DLL by:
      creating a secure message that includes the user authentication data; and
      transmitting the secure message to the local messaging facility service;
      receiving the secure message at the local messaging facility service from the DLL using a message handler from the plurality of message handlers;
      determining by the message handler that the destination is an authentication server having a remote messaging facility service based on destination information in the secure message; and
      routing the secure message to the remote messaging facility service using the transport mechanism.

* * * * *